(12) United States Patent
Porte et al.

(10) Patent No.: US 6,427,434 B2
(45) Date of Patent: Aug. 6, 2002

(54) DEVICE FOR DISCHARGING HOT AIR FOR A JET ENGINE AIR INLET COWL, WITH A DEICING CIRCUIT

(75) Inventors: Alain Porte, Allée de Belle-Ile; Stéphane Viala, Hameau Lacour, both of (FR)

(73) Assignee: Aerospatiale Matra Airbus, Paris (FR)

( * ) Notice: Subject to any disclaimer, the term of this patent is extended or adjusted under 35 U.S.C. 154(b) by 0 days.

(21) Appl. No.: 09/739,640

(22) Filed: Dec. 20, 2000

(30) Foreign Application Priority Data

Dec. 21, 1999 (FR) .............................................. 99 16155

(51) Int. Cl.⁷ .............................................. F02C 7/047
(52) U.S. Cl. .................. 60/39.093; 244/134 B
(58) Field of Search .................... 60/39.093; 244/134 B

(56) References Cited

U.S. PATENT DOCUMENTS

| | | | |
|---|---|---|---|
| 3,933,327 A | 1/1976 | Cook et al. | |
| 4,757,963 A | 7/1988 | Cole | |
| 4,782,658 A | 11/1988 | Perry | |
| 5,365,731 A | 11/1994 | Nikkanen et al. | |
| 6,131,855 A | * 10/2000 | Porte | 244/134 B |

FOREIGN PATENT DOCUMENTS

| | | |
|---|---|---|
| EP | 0205283 | 12/1986 |
| EP | 0536089 | 4/1993 |
| EP | 0921293 | 6/1999 |
| GB | 2259679 | 3/1993 |

* cited by examiner

*Primary Examiner*—Michael Koczo
(74) *Attorney, Agent, or Firm*—Stevens, Davis, Miller & Mosher, LLP

(57) ABSTRACT

A device for discharging hot air for a jet engine air inlet cowl, with a deicing circuit. The air inlet cowl for a jet engine, the leading edge of which is hollow and swept with a flow of deicing hot air, includes orifices for discharging the hot air flow to the outside of the leading edge, which form an arrangement such that at least two pressurized hot air jets passing through two adjacent orifices have, downstream of a calibration piece in which the orifices are made, different inclinations with respect to the calibration piece.

14 Claims, 8 Drawing Sheets

DEVICE FOR DISCHARGING HOT AIR FOR A JET ENGINE AIR INLET COWL, WITH A DEICING CIRCUIT

BACKGROUND OF THE INVENTION

The present invention relates to the deicing of air inlet cowls of jet engines, particularly aircraft engines.

It is known that, if necessary (as a preventative measure against the formation of ice or to eliminate ice already formed), the leading edge of the air inlet cowl of such engines is deiced by heating it with pressurized hot air tapped from said engine and supplied to said leading edge by a hot air circulation circuit.

To this end, an air inlet cowl such as this comprises:
- a hollow leading edge delimiting an internal peripheral chamber closed by an internal partition (or frame) and equipped with orifices placing said internal chamber in communication with the outside; and
- a pipe which can be connected, at its rear end which is the opposite end to said leading edge, to said hot air circulation circuit and, at its front end toward the leading edge, to an injector injecting said hot air into said internal chamber.

Thus, the pressurized hot air injected by said injector sweeps through said internal peripheral chamber, heating it up, and is discharged through said orifices.

DESCRIPTION OF THE PRIOR ART

U.S. Pat. No. 5,365,731 already discloses an air inlet cowl of this type comprising a number of such hot air discharge orifices made directly in the leading edge of said cowl, the rate of flow of the deicing hot air being controlled by the cross section of said orifices. A known air inlet cowl such as this has the major drawbacks of weakening the leading edge of said cowl (which happens to be the most vulnerable part of an engine nacelle, because it is located at the front, and to be difficult to repair because of its large size) and of substantially degrading the aerodynamic performance of said cowl. Specifically, as far as the latter drawback is concerned, this is because said orifices are located in a shape of leading edge that encourages scooping — and therefore makes the ejection of hot air difficult — this being true throughout all the phases of flight of the aircraft when the deicing is not in operation. In addition, the ejection orifices produce a large ejection area, which leads to drag over a high proportion of the leading edge, this drag being accentuated by the fact that the surface of the nacelle immediately downstream of this aerodynamically polluted surface, is also generally very disturbed, which means that it generates additional drag. Furthermore, in a known air inlet cowl such as this, it is difficult to correct the ejection cross section during flight trials, because this section consists of orifices made in a very large part (the leading edge).

Another source, document EP-A-0 205 283, discloses an air inlet cowl in which said pressurized hot air supply pipe is surrounded by an enveloping metallic structure comprising pipework, the free end of which forms an orifice used for ejecting deicing air to the rear of the leading edge of said cowl. This then avoids the aforementioned drawbacks but, in this known device, the rate of flow of hot air is controlled by the cross section of said ejection pipework, as well as by the orientation of fins located at the free end thereof. This results in poor control over the ejection rate and in layers of hot air on the outside. In addition, the ejection of the hot air is highly concentrated, which may damage nearby structures which are sensitive to heat. In any case, a device such as this is the source of significant thermal radiation, also with the risk of damaging said structures. Finally, the device is expensive because it consists of many parts which have to be assembled using joints whose life is limited because they are subjected to high temperatures.

Also known, for example from document GB-A-2 259 679, is an air inlet cowl in which the deicing hot air is discharged to the outside by bent pipework passing through said internal partition to eject the hot air at the rear of said leading edge. Here again, the rate of flow of hot air is controlled by the cross section of the pipework and by the orientation of fins arranged therein. This air inlet cowl therefore again encounters the same drawbacks as those mentioned hereinabove with regard to document EP-A-0 205 283.

Finally, document EP-A-0 536 089 discloses an air inlet cowl in which said internal partition is equipped with a trough-shaped duct directed toward the rear of the leading edge and open toward the periphery of said air inlet cowl. The trough-shaped duct is closed off by a plate pierced with a multitude of identical rectangular orifices, whose direction is orthogonal to the leading edge, said orifices being aligned parallel to the latter.

By virtue of this arrangement, said orifices, which serve to discharge to the outside the pressurized hot air which has heated up said leading edge, may be in the part of said cowl that is located just behind said leading edge. This therefore means that the leading edge, which is a part which is sensitive from the aerodynamic point of view in terms of engine performance and from the maintenance point of view because it is exposed to various impacts, is not weakened by said orifices. However, an arrangement such as this does not make it possible to optimize the ejection of the deicing hot air either aerodynamically or thermally or acoustically, particularly because:
- the jets of hot air passing through said rectangular orifices tend to group together downstream of said plate, which gives rise to significant aerodynamic drag and detracts from the cooling of said jets (the thermal radiation of which thus runs a risk of burning the outer surface — generally made of composite material — of said cowl downstream of said plate); and
- the jets of hot air passing through the lateral rectangular orifices widen laterally and burn the lateral surface, also made of composite material, of said cowl, which surface is located laterally to said plate.

Furthermore, such orifices give rise to aerodynamic noise, whistling, etc.

SUMMARY OF THE INVENTION

The object of the present invention is to overcome these drawbacks.

To this end, according to the invention, the air inlet cowl for a jet engine, particularly for an aircraft, said air inlet cowl being equipped, at the front, with means for deicing its leading edge and for this purpose comprising:
- a hollow leading edge delimiting an internal peripheral chamber which is closed by an internal partition, said internal partition being equipped with a trough-shaped duct directed toward the rear of said leading edge and open toward the periphery of said air inlet cowl;
- a pipe which can be connected, at its rear end which is the opposite end to said leading edge, to a pressurized hot air circuit and, at its front end toward said leading edge, to an injector injecting said pressurized hot air into said internal chamber; and a calibration piece made of a material resistant to high temperatures and forming part of the external surface of said cowl, to the rear of said leading edge, said piece closing off said trough-shaped duct and being pierced with orifices to place said internal chamber in communication with the outside, said orifices being distributed at least roughly parallel to said leading edge and serving to calibrate the flow of pressurized hot air ejected by said trough-shaped duct, while deflecting away from said cowl the pressurized hot air jets resulting from the passage of said flow of hot air through said orifices, is noteworthy in that said orifices form an arrangement such that at least two pressurized hot air jets passing through two adjacent orifices have, downstream of said calibration piece, different inclinations with respect to said calibration piece, and in that said calibration piece extends longitudinally in said external surface of said cowl, toward the rear thereof, to act as thermal protection for said cowl with respect to said hot air jets passing through said orifices.

Thus, said orifices allow control over the rate of ejection and, also, make it possible to obtain favorable heat exchange between the ejected hot air and the external ambient air while at the same time controlling the spread of the hot air jet in order to keep it away from the temperature-sensitive structures of the nacelle. This then avoids the drawbacks of the orifices of the known deicing devices which:

when they are in the form of a circular orifice, excessively concentrate the ejection cross section and afford a small area for heat exchange between the jet of deicing air and the ambient external air, the energy of said jet being too great which means that it risks reaching the temperature-sensitive structures and damaging them; and when they are spread, as a multitude of orifices, give rise to acoustic emissions, aerodynamic drag prejudicial to aircraft performance, even when the deicing circuit is not in operation, and the risk of burning the cowl around said orifices.

It will in fact be noted that, by virtue of the differences in inclination of said hot air jets with respect to said calibration piece, the fresh aerodynamic flow can very easily penetrate between these jets, cooling them efficiently and avoiding, or at the very least reducing, the generation of parasitic drag and acoustic noise.

It will also be noted that, by virtue of the invention, the longitudinal extension of said calibration piece can be chosen so that the heating of the external surface of the cowl, downstream of said piece as a result of the thermal radiation of said hot air jets, remains below a given temperature threshold capable of avoiding thermal damage to said surface.

In one particular embodiment, said orifices form an arrangement such that, in addition, at least one pressurized hot air jet passing through an orifice (lateral or otherwise) of said calibration piece is absorbed, downstream of this piece, by at least one pressurized hot air jet passing through an orifice occupying an adjacent position, for example a less lateral position, in said calibration piece.

Furthermore, in an advantageous embodiment, in which said orifices have an oblong shape and are oriented at least approximately longitudinally, that is to say from the front of the cowl to the rear, the area of each orifice depends on the position of this orifice in said arrangement, this area varying according to how laterally positioned said orifice is. As a preference, the area is all the smaller the more lateral the position of the orifice, and all the greater the more central the position of said orifice, although the reverse is, however, equally possible.

By virtue of this arrangement, the energy of a hot air jet is all the greater the greater the area of the corresponding orifice, so that:

the inclination of a hot air jet with respect to said calibration piece depends on the area of the orifice through which said jet passes, a jet corresponding to an orifice of larger area being kept further away from the surface of the cowl than a jet corresponding to an orifice of smaller area; and the air jets of lower energy, particularly the lateral hot air jets, can be absorbed by the jets of higher energy.

The front edges of said orifices of the arrangement may be at least roughly aligned parallel to said leading edge and said orifices may have an at least roughly rectangular shape.

Furthermore, to optimize the penetration of the aerodynamic flow between said jets and therefore optimize the heat exchange between said flow and these jets, it is advantageous for each oblong orifice to be oriented at least roughly parallel to the stream lines of said aerodynamic flow flowing over said calibration piece, for example when the aircraft is in cruising flight.

In one particularly simple and effective embodiment of the cowl according to the present invention, said arrangement of orifices comprises at least one large central orifice, two small lateral orifices arranged on each side of said central orifice and two intermediate orifices, the area and position of which are respectively between those of said large central orifice and those of said small lateral orifices.

It will be noted that the number of orifices depends on the dimensions of the calibration piece. Specifically, the shorter this piece, the greater the efficiency of the heat exchanger (consisting of the orifices) will have to be. It may therefore be necessary to vary the number of orifices in order to obtain the desired effect. Conversely, the longer the calibration piece, the more the number of orifices can be reduced, the quality of the heat exchanger being less of an important issue here.

Of course, in the context of the present invention, the total number of orifices may be even or odd. However, as a preference, said number of orifices is an odd number. This in particular makes it possible to improve the efficiency because the lateral jets then, through a lift effect, play a part in lifting the central jet.

Moreover and advantageously, said arrangement of orifices is symmetrical, preferably with respect to a longitudinal plane which, in the case of an odd number of orifices, passes through the central orifice and, in the case of an even number, passes mid-way between the two central orifices.

In order to optimize the thermal protection afforded by said calibration piece while at the same time minimizing its mass, it is advantageous for at least one of the longitudinal edges of said calibration piece to have the shape of the stream lines of the aerodynamic flow flowing over said calibration piece when the aircraft is in cruising flight.

As a preference, said trough-shaped duct is peripherally in the vicinity of said pressurized hot air supply pipe. Thus, said hot air sweeps through the entire circumference of said leading edge and very uniform distribution of said hot air inside the latter, and therefore very good deicing performance, are obtained.

Said calibration piece may in addition form the inspection hatch for said hot air supply pipe. Benefit can therefore be derived from the presence, compulsory for access to the deicing air pipework, of a dismantleable and high-temperature-resistant panel located immediately behind said ejection orifices. As mentioned above, such a hatch may extend longitudinally in the external surface of the cowl over sufficient length to protect the entire part of that surface which may be subjected to the action of the flow of hot air ejected by said orifices. In addition, by providing several dismantleable panels equipped with different ejection orifice arrangements, one panel can easily be replaced with another to test various ejection orifice arrangements.

Furthermore, it is advantageous for said trough-shaped duct to widen toward the external periphery of said cowl. It may thus have an aerodynamic shape that encourages the ejection of air.

Said trough-shaped duct may form an integral part of said internal partition and, for example, be formed by pressing the latter. It may also constitute a piece attached to said internal partition, in a recess thereof.

It can thus be seen that the leading edge of the cowl according to the present invention is homogeneous over all 360° of its circumference, without protrusions or vent orifices, thus preserving its aerodynamic and mechanical strength qualities.

BRIEF DESCRIPTION OF THE DRAWINGS

The figures of the appended drawing make it easy to understand how the invention may be realized. In these figures, identical references denote similar elements.

DESCRIPTION OF THE PREFERRED EMBODIMENTS

Figure 1:
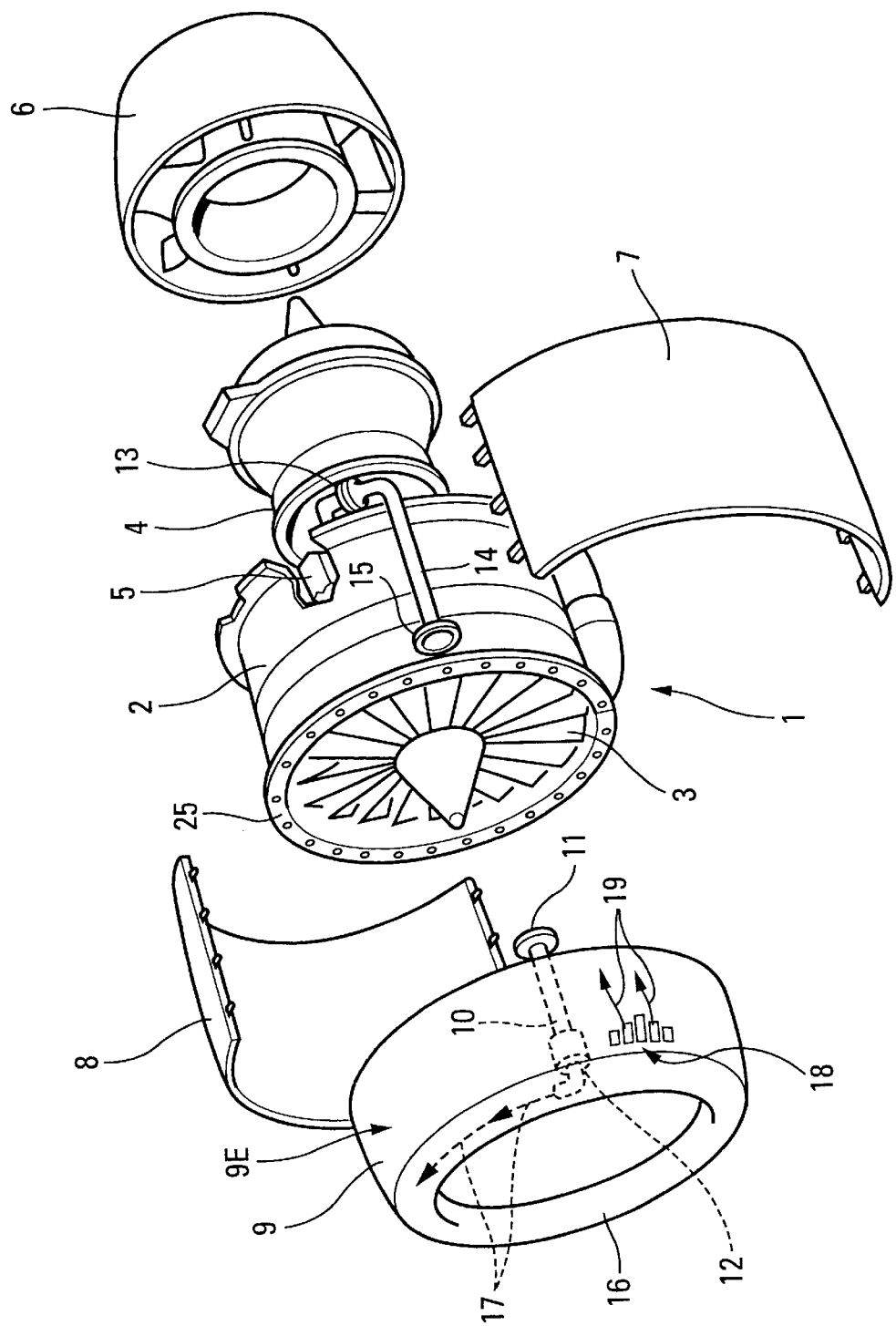
FIG. 1 shows, in exploded perspective, one example of an aircraft jet engine and its various cowlings.

The bypass engine 1 depicted diagrammatically in FIG. 1 comprises, in a known way, a central hot air generator 2, a fan 3 and compressor stages 4, and is equipped with an attachment 5 for suspending from a support stub (not depicted). Associated with and fixed to the engine 1 are a jet pipe assembly 6, two lateral cowls 7 and 8 and an air inlet cowl 9.

As illustrated diagrammatically in FIG. 1, the air inlet cowl 9 comprises an internal pipe 10 equipped, at its rear end facing toward the engine 1, with a coupling 11 and, at its front end, housed in the hollow leading edge 16 of said air inlet cowl, with an injector 12. Moreover, arranged on one compressor stage of the engine 1 is a pressurized hot air inlet 13 which is connected to a pipe 14 equipped, facing the coupling 11 of the pipe 10, with a complementary coupling 15.

Thus, when the complementary couplings 11 and 15 are coupled together, hot air (for example at a temperature of 400° C.) tapped at hot air inlet 13 from the engine 1 is conveyed through the pipes 14 and 10 as far as the injector 12. The latter can therefore blow this pressurized hot air (dotted arrows 17) into the leading edge 16 to deice it. An arrangement 18 of oblong orifices is provided, according to the present invention, in the outer surface 9E of the cowl 9 to discharge to the open air (arrows 19) the hot air which has circulated inside the leading edge 16 (now, for example, at a temperature of 200° C.)

As shown in detail and on a larger scale in FIGS. 2, 3, 5, 7 and 8, the hollow leading edge 16 is closed at the rear by an internal partition 20 so that an annular peripheral chamber 21 is formed inside said leading edge 16. The injector 12 injects pressurized hot air into the chamber 21 and the arrangement of oblong orifices 18 places said chamber 21 in communication with the outside.

The internal partition 20 is equipped with a trough-shaped duct 22 directed and widening toward the rear of said leading edge 16, that is to say on the side of the actual cowl 9 proper, and open toward the periphery of said air inlet cowl 9. The duct 22 may be produced by indenting said internal partition 20, for example by pressing, or may alternatively consist of a part attached to said partition 20.

The arrangement of oblong orifices 18 is made in a calibration piece 23 forming part of the outer surface 9E of the cowl 9, behind the leading edge 16, and faces the duct 22 limiting and calibrating the cross section thereof.

Thus, the hot air which has heated up the leading edge 16 is conveyed by the duct 22 to the arrangement of orifices 18 which discharges it toward the outside, controlling its rate of flow.

Figure 3:
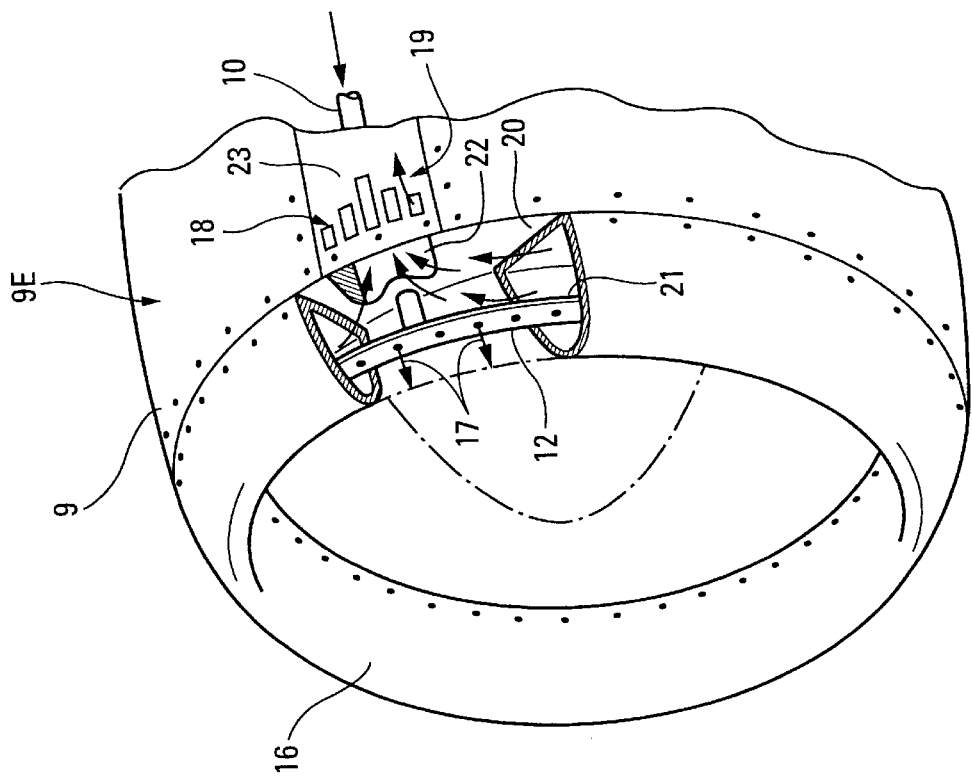
FIGS. 2 and 3 are views in partial perspective from the front, with cutaway, of two embodiments of the air inlet cowl according to the present invention.
Figure 2:
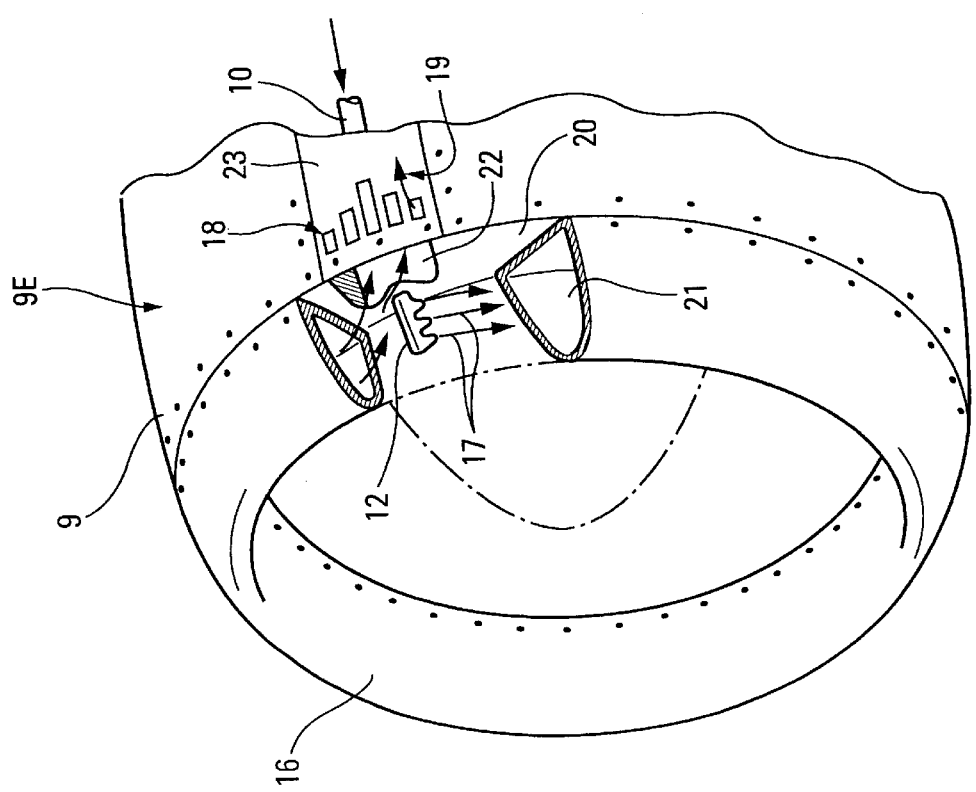
Figure 7:
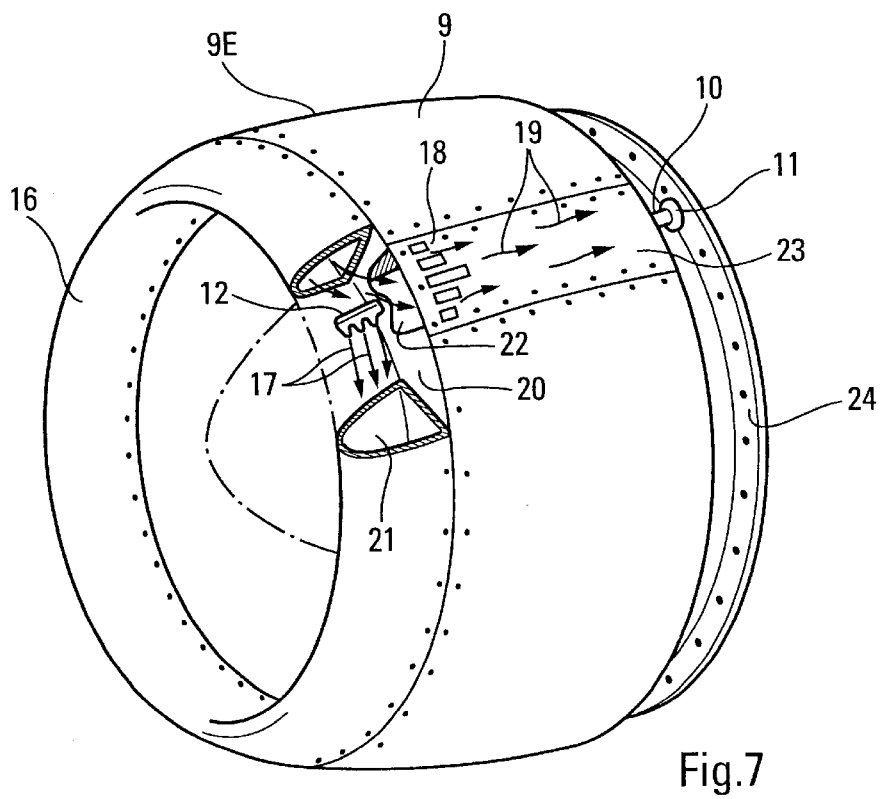
FIG. 7 is a perspective view from the front, with cutaway, of one embodiment of the air inlet cowl according to the present invention.
Figure 10:
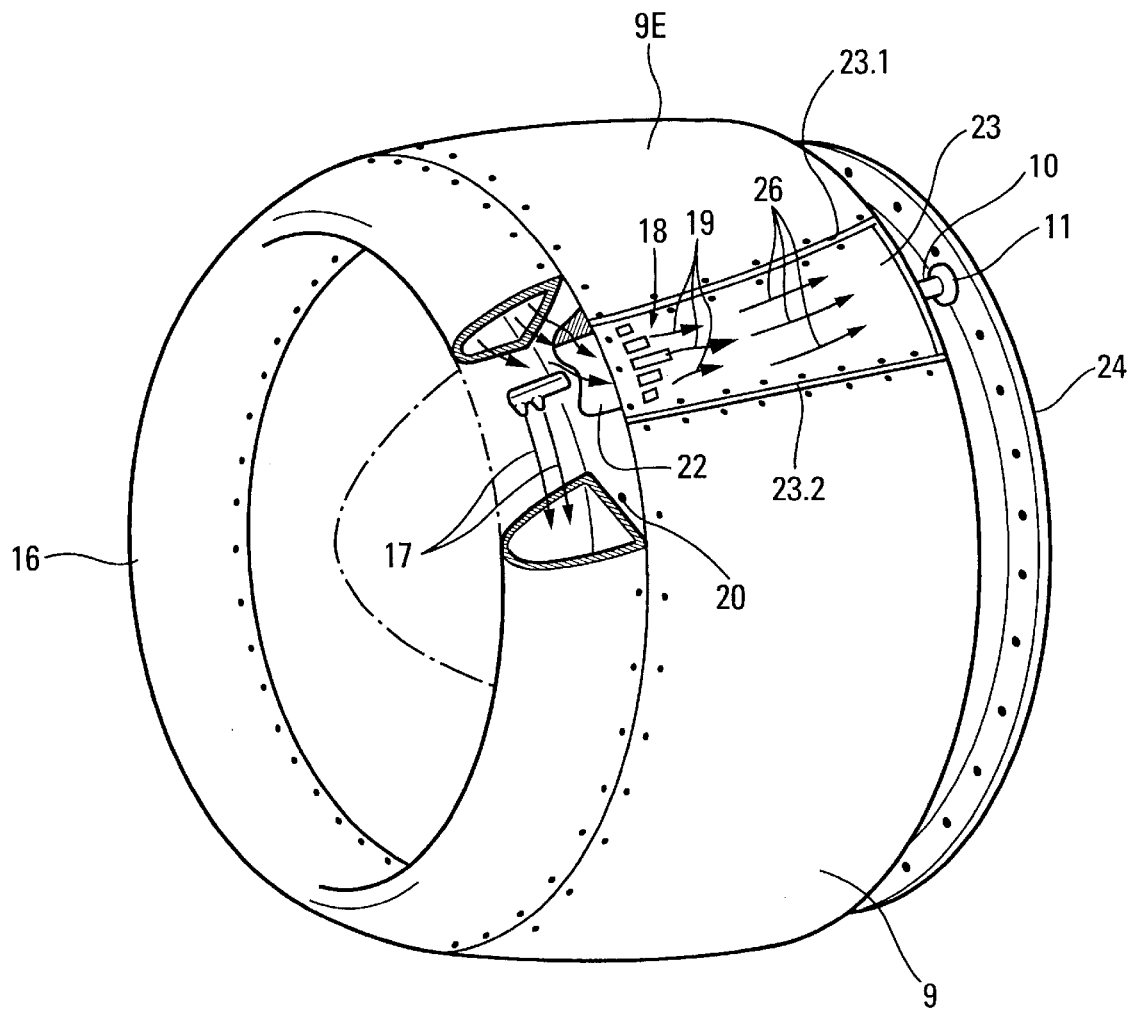
FIG. 10 is a perspective view from the front, with cutaway, of an alternative form of the air inlet cowl according to the present invention, corresponding to FIGS. 8 and 9.

FIGS. 2 and 3 show that the injector 12 may be of any kind: for example, it comprises multiple nozzles (FIG. 2) or consists of a pierced annulus (FIG. 3). They also show, as do FIGS. 4 and 5, that the duct 22 is peripherally near the pipe 10. Thus, although the calibration piece 23 can be specially designed to close off the duct 22 (see FIGS. 2 and 3), it may advantageously constitute the hatch made in the cowl 9 for inspecting the pipe 10, as shown in FIGS. 7 and 10. In both instances, the piece 23 is made of a fire and heat resistant material, for example a metallic material. The piece 23 may extend over the entire length of the cowl 9. FIGS. 7 and 10 show the flange 24 capable of collaborating with the front flange 25 of the engine, to attach said air inlet cowl 9 to this engine.

Figure 4:
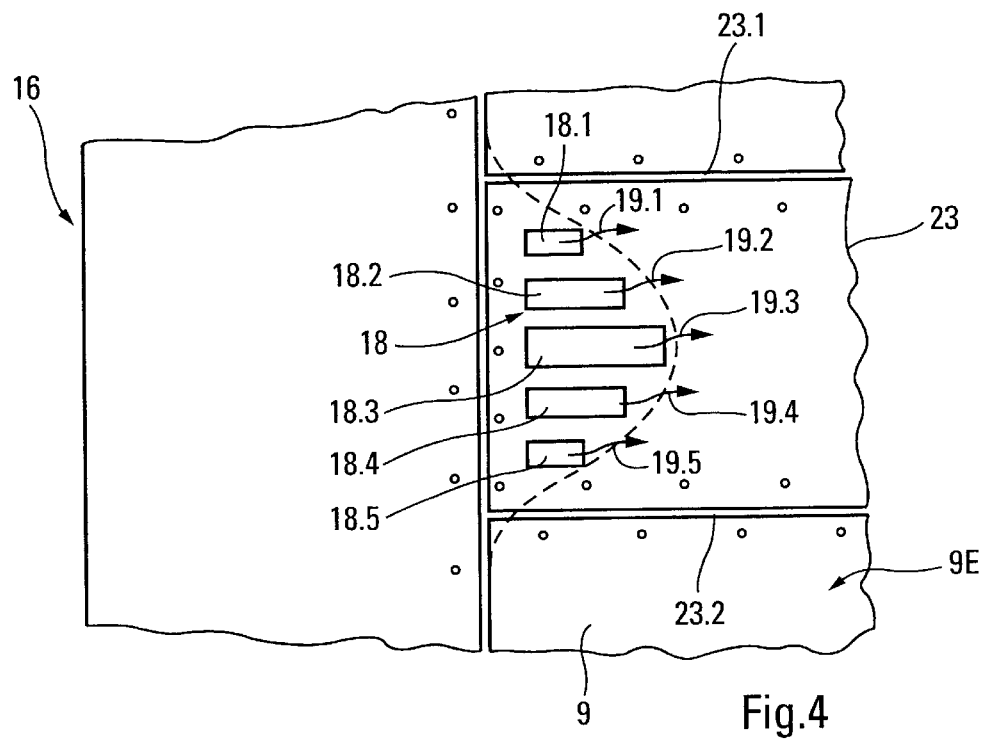
FIG. 4 is a face-on view illustrating one advantageous embodiment of the arrangement of ejection orifices according to the present invention.

In the example depicted in FIGS. 1 to 7, the arrangement 18 comprises five orifices 18.1 to 18.5, in the form of rectangular slits, the front edges of which are aligned parallel to the leading edge 16 (see, in particular, FIG. 4 and the corresponding FIG. 7). The orifices 18.1 to 18.5 are mutually parallel and parallel to the longitudinal axis of the cowl 9 (not depicted). The arrangement 18 comprises small lateral orifices 18.1 and 18.5, a large central orifice 18.3 and two intermediate orifices 18.2 and 18.4 which are placed respectively between said large central orifice 18.3 and said small lateral orifices 18.1 and 18.5, and the area of which is between those of said small orifices 18.1 and 18.5 and of the large central orifice 18.3.

Figure 5:
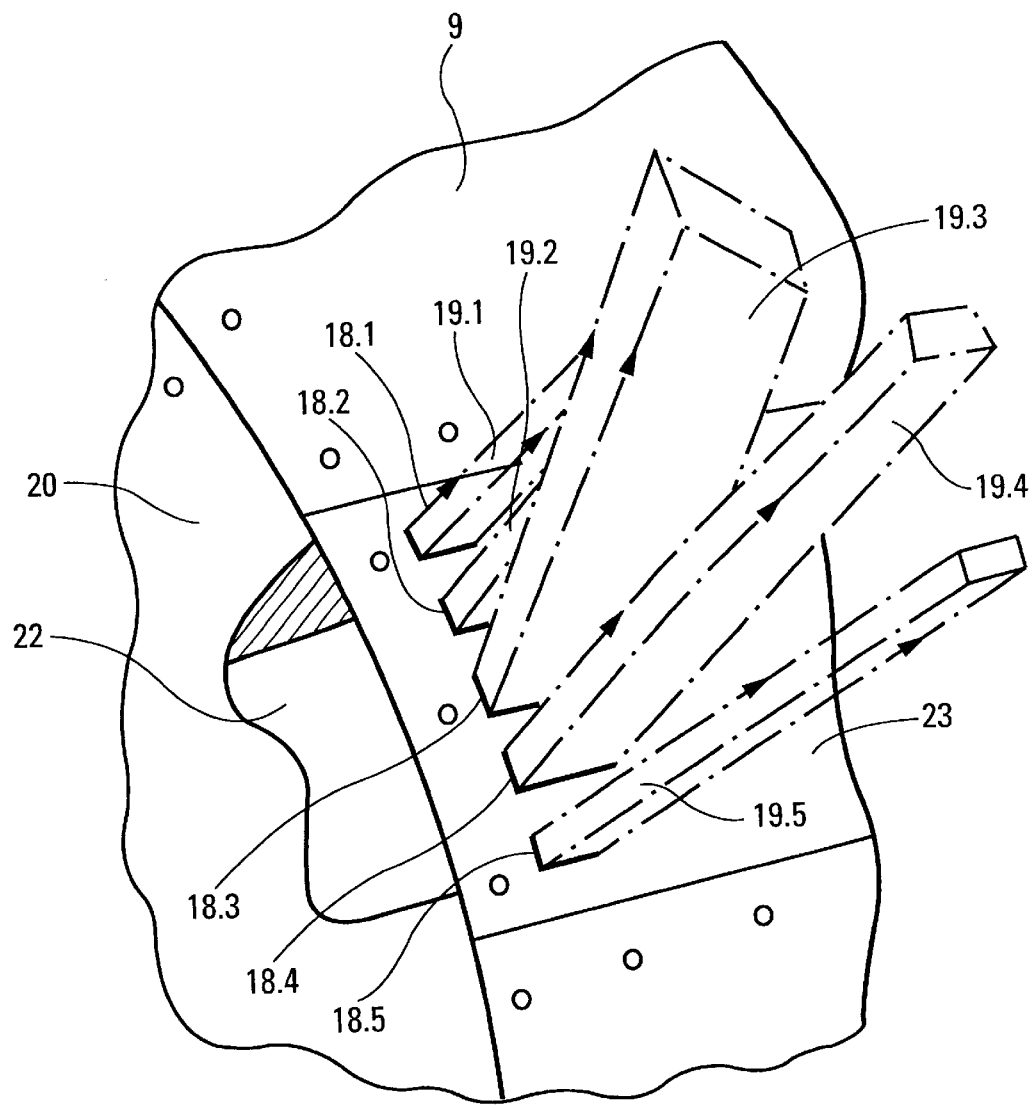
FIG. 5 illustrates, in an enlarged and schematic partial perspective view, the action of the arrangement of ejection orifices according to the present invention.

Thus, as illustrated by FIG. 5:
- the central hot air jet 19.3 passing through the large central orifice 18.3 has a great deal of energy and is kept a great distance away from the piece 23;
- the intermediate hot air jets 19.2 and 19.4, passing respectively through the intermediate orifices 18.2 and 18.4 have less energy than the hot air jet 19.3 and are also less far away from the piece 23 than the latter jet; and
- the lateral hot air jets 19.1 and 19.5, passing respectively through said lateral orifices 18.1 and 18.5, have little energy and are far less far away from the piece 23.

Figure 6:
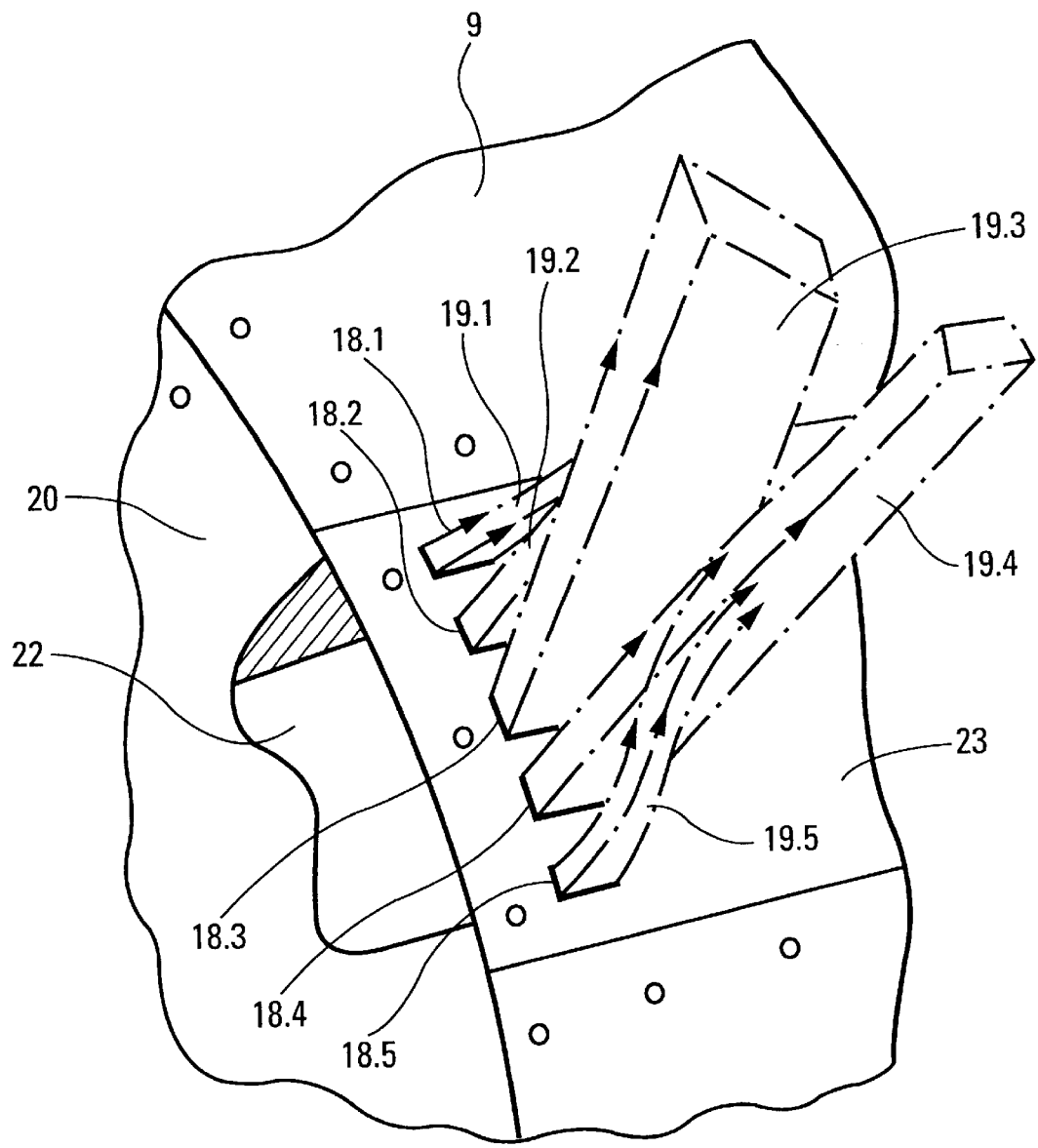
FIG. 6 illustrates, in a view similar to FIG. 5, an alternative form of action of the arrangement of ejection orifices according to the present invention.

Moreover, the particular embodiment depicted in FIG. 6 differs from the aforementioned one in FIG. 5 in that some of the pressurized hot air jets, in this particular instance the lateral air jets 19.1 and 19.5, passing through orifices 18.1 and 18.5 of said calibration piece 23, are absorbed, downstream of this piece, by at least one pressurized hot air jet 19.2 and 19.4 passing through an orifice 18.2 and 18.4 occupying an adjacent position, in this particular instance a less lateral position, in said calibration piece 23. This is achieved by tailoring the areas of said orifices 18.1 to 18.5.

In the embodiments of FIGS. 1 to 7, the orifices 18.1 to 18.5 and the lateral edges 23.1 and 23.2 of the piece 23 are longitudinal, that is to say extend from the front to the rear, parallel to the longitudinal axis of the cowl 9.

Figure 8:
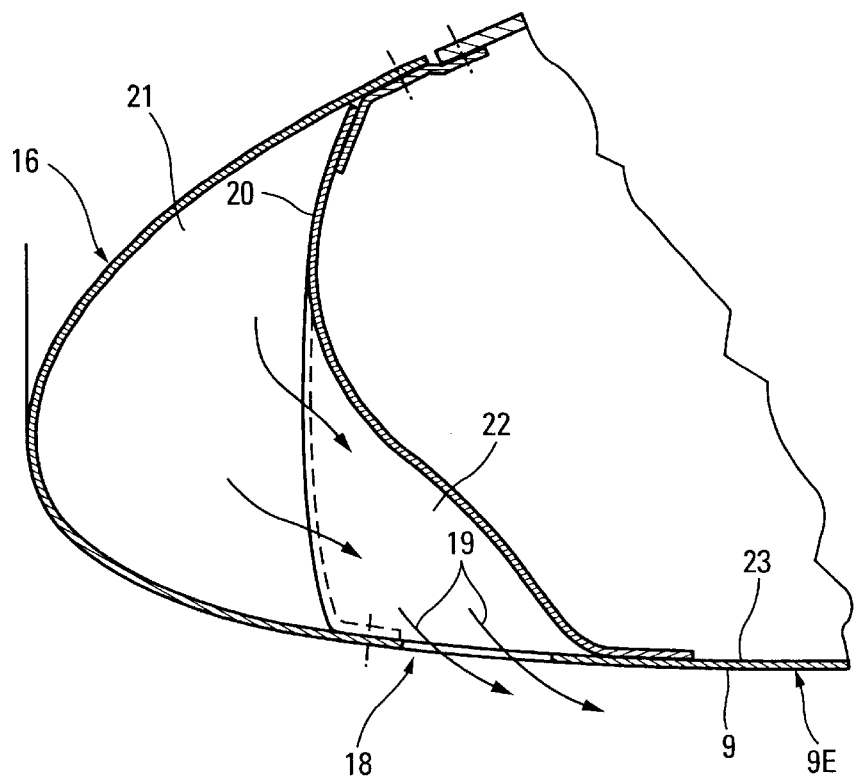
FIG. 8 is a diagrammatic and partial half section of the front part of an air inlet cowl according to the present invention.
Figure 9:
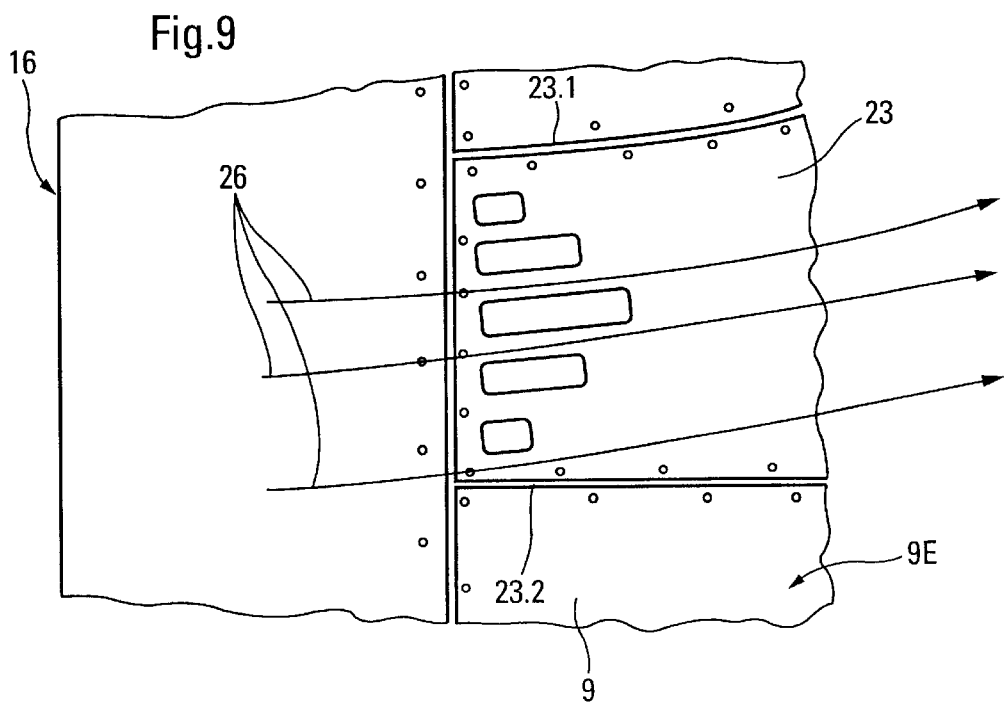
FIG. 9 shows, in a partial plan view of FIG. 8, an alternative form of the arrangement of ejection orifices according to the invention.

By contrast, in the embodiments of FIGS. 8, 9 and 10, the orifices 18.1 to 18.5 and at least the lateral edge 23.1 of the piece 23 are respectively oriented and/or shaped at least roughly parallel to the stream lines 26 of the aerodynamic flow flowing over said piece 23, for example when the aircraft comprising the engine 1 is in cruising flight.

Of course, the number of orifices depends on the dimensions of the calibration piece 23. Specifically, the shorter this piece, the greater the efficiency of the heat exchanger (consisting of the orifices) will have to be. It may therefore be necessary to vary the number of orifices in order to obtain the desired effect. Conversely, the longer the calibration piece 23, the more the number of orifices may be reduced, the quality of the heat exchanger being less of an important issue in this case. Thus, at the minimum, it may be possible to provide two orifices of different areas, the maximum number of orifices being governed by the calibration piece 23.

Figure 11:
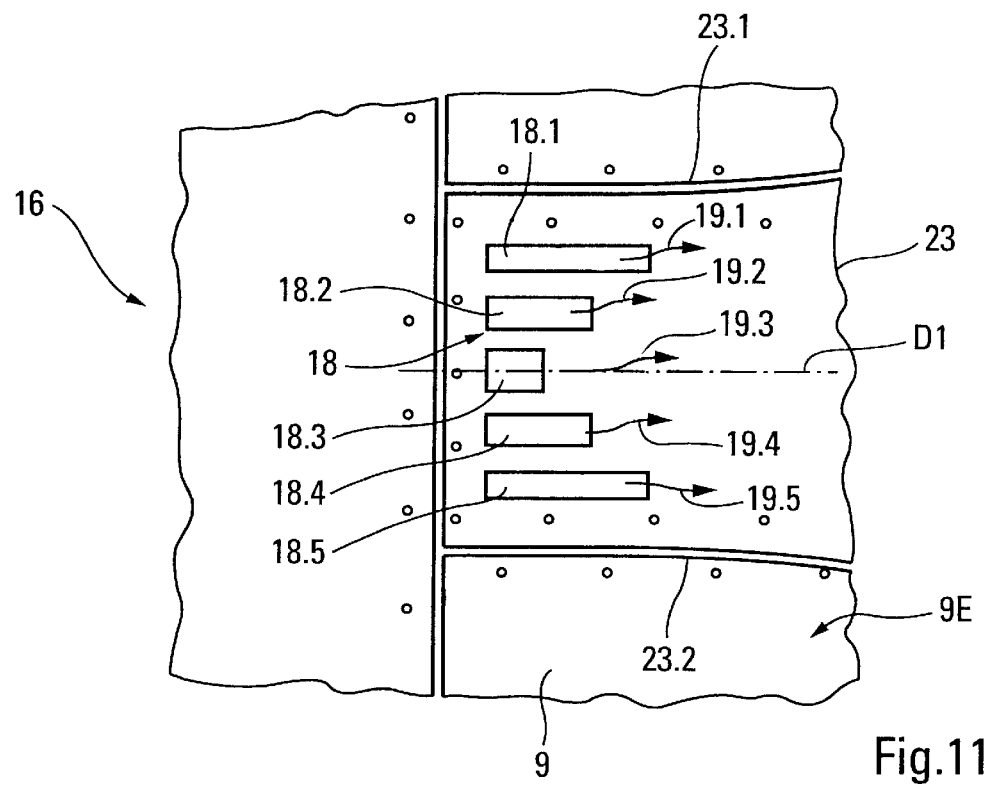
FIGS. 11 and 12 show, in views similar to FIGS. 4 and 9, two other alternative forms of the arrangement of ejection orifices according to the present invention.

In addition, in the context of the present invention, the number of orifices may be an even number (FIG. 12) or an odd number (FIG. 11 for example). However, an odd number of orifices is more favorable, because simulation shows that the lateral jets then contribute, through a lift effect, to lifting the central jet.

Figure 12:
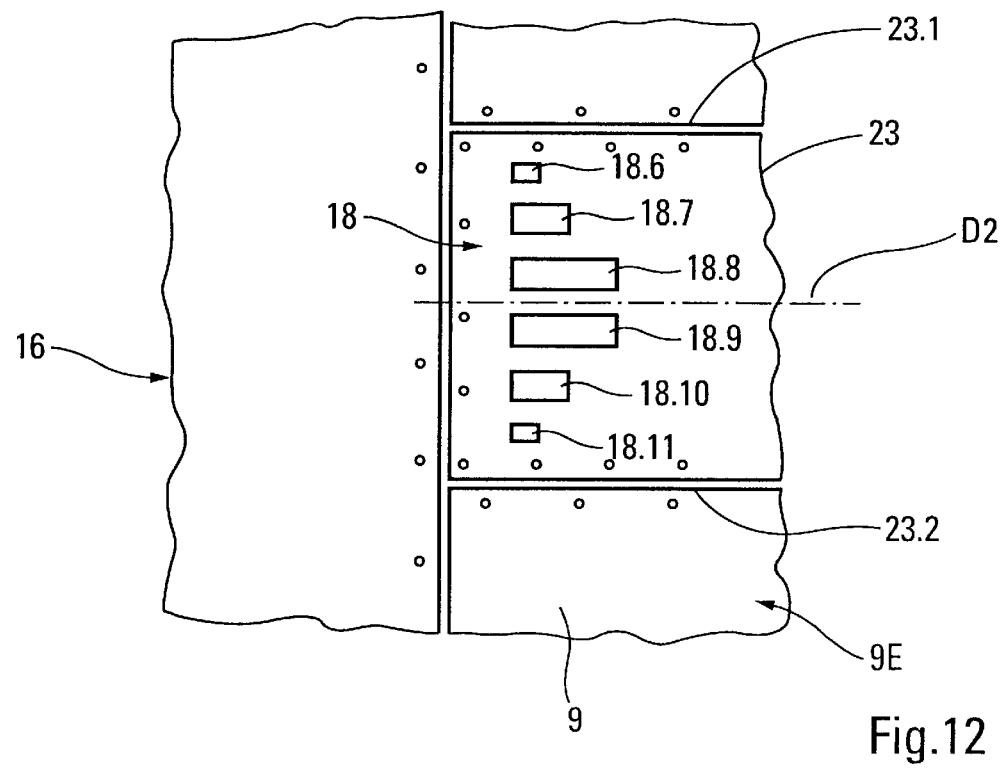

Furthermore, and as a preference, although not exclusively, said arrangement 18 of orifices is symmetric with respect to a longitudinal plane, namely:
- a plane passing through the mid-point of the central orifice 18.3, in the case of an odd number of orifices 18.1 to 18.5, as illustrated by a straight line D1 representing this plane in FIG. 11; and
- a plane passing through the mid-point of the two central orifices 18.8 and 18.9, in the case of an even number of orifices 18.6 to 18.11, as illustrated by a straight line D2 representing this plane in FIG. 12.

It will also be noted that the variation in area of the orifices may either decrease toward the lateral orifices, as depicted, for example, in FIGS. 4, 9 and 12, or increase toward said lateral orifices, as depicted, for example, in FIG. 11.

In the latter instance, the geometry of the calibration piece 23 will need to be adapted to suit.

What is claimed is:

1. An air inlet cowl for a jet engine, particularly for an aircraft, said air inlet cowl being equipped, at the front, with means for deicing its leading edge and for this purpose comprising:
- a hollow leading edge delimiting an internal peripheral chamber which is closed by an internal partition, said internal partition being equipped with a trough-shaped duct directed toward the rear of said leading edge and open toward the periphery of said air inlet cowl;
- a pipe which can be connected, at its rear end which is the opposite end to said leading edge, to a pressurized hot air circuit and, at its front end toward said leading edge, to an injector injecting said pressurized hot air into said internal chamber; and
- a calibration piece made of a material resistant to high temperatures and forming part of the external surface of said cowl, to the rear of said leading edge, said piece closing off said trough-shaped duct and being pierced with at least two orifices to place said internal chamber in communication with the outside, said orifices being distributed at least roughly parallel to said leading edge and serving to calibrate the flow of pressurized hot air ejected by said trough-shaped duct, while deflecting away from said cowl the pressurized hot air jets resulting from the passage of said flow of hot air through said orifices, said orifices having an oblong shape and being oriented at least approximately longitudinally with respect to said cowl,
wherein said orifices form an arrangement in which an area of each orifice depends on its position in said arrangement, the area varying according to an extent of lateral positioning of said orifice, wherein at least two pressurized hot air jets passing through two adjacent orifices have, downstream of said calibration piece, different inclinations with respect to said calibration piece, and wherein said piece extends longitudinally in said external surface of said cowl, toward the rear thereof, to act as thermal protection for said cowl with respect to said hot air jets passing through said orifices.

2. The air inlet cowl as claimed in claim 1, wherein at least one pressurized hot air jet passing through an orifice of said calibration piece is absorbed, downstream of this piece, by at least one pressurized hot air jet passing through an orifice occupying an adjacent position in said calibration piece.

3. The air inlet cowl as claimed in claim 1, wherein the front edges of the orifices of the arrangement are at least roughly aligned parallel to said leading edge.

4. The air inlet cowl as claimed in claim 1, wherein the aerodynamic flow flowing over said piece has stream lines of a plurality of different shapes and each oblong orifice is oriented at least roughly parallel to a predetermined shape corresponding to at least one of said plurality of shapes.

5. The air inlet cowl as claimed in claim 1, wherein said orifices have an at least roughly rectangular shape.

6. An air inlet cowl for a jet engine, particularly for an aircraft, said air inlet cowl being equipped, at the front, with means for deicing its leading edge and for this purpose comprising:
- a hollow leading edge delimiting an internal peripheral chamber which is closed by an internal partition, said internal partition being equipped with a trough-shaped duct directed toward the rear of said leading edge and open toward the periphery of said air inlet cowl;

a pipe which can be connected, at its rear end which is the opposite end to said leading edge, to a pressurized hot air circuit and, at its front end toward said leading edge, to an injector injecting said pressurized hot air into said internal chamber; and a calibration piece made of a material resistant to high temperatures and forming part of the external surface of said cowl, to the rear of said leading edge, said piece closing off said trough-shaped duct and being pierced with at least two orifices to place said internal chamber in communication with the outside, said orifices being distributed at least roughly parallel to said leading edge and serving to calibrate the flow of pressurized hot air ejected by said trough-shaped duct, while deflecting away from said cowl the pressurized hot air jets resulting from the passage of said flow of hot air through said orifices, wherein said orifices form an arrangement in which at least two pressurized hot air jets passing through two adjacent orifices have, downstream of said calibration piece, different inclinations with respect to said calibration piece, and in which said piece extends longitudinally in said external surface of said cowl, toward the rear thereof, to act as thermal protection for said cowl with respect to said hot air jets passing through said orifices, wherein said arrangement of orifices comprises at least one large central orifice, two small lateral orifices arranged on each side of said central orifice and two intermediate orifices, the area and position of which are respectively between those of said large central orifice and those of said small lateral orifices.

7. The air inlet cowl as claimed in claim 1, wherein the number of orifices is an odd number.

8. The air inlet cowl as claimed in claim 1, wherein said arrangement of orifices is symmetrical.

9. The air inlet cowl as claimed in claim 1, wherein the aerodynamic flow flowing over said piece when the aircraft is in cruising flight has stream lines of a plurality of different shapes and at least one of the longitudinal edges of said calibration piece has a predetermined shape corresponding to at least one of said plurality of shapes.

10. The air inlet cowl as claimed in claim 1, wherein said calibration piece is an inspection hatch for said pipe.

11. The air inlet cowl as claimed in claim 1, wherein said trough-shaped duct is peripherally in the vicinity of said pipe.

12. The air inlet cowl as claimed in claim 1, wherein said trough-shaped duct widens toward the periphery of said air inlet cowl.

13. The air inlet cowl as claimed in claim 1, wherein said trough-shaped duct forms an integral part of said internal partition.

14. The air inlet cowl as claimed in claim 1, wherein said trough-shaped duct consists of a piece attached to said internal partition.

* * * * *